United States Patent
Park et al.

(10) Patent No.: US 12,051,822 B2
(45) Date of Patent: Jul. 30, 2024

(54) SECONDARY BATTERY AND BATTERY PACK INCLUDING THE SAME

(71) Applicant: LG Chem, Ltd., Seoul (KR)

(72) Inventors: Min Hee Park, Daejeon (KR); Sang Jun Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 435 days.

(21) Appl. No.: 17/254,584

(22) PCT Filed: Apr. 8, 2020

(86) PCT No.: PCT/KR2020/004752
§ 371 (c)(1),
(2) Date: Jan. 27, 2021

(87) PCT Pub. No.: WO2020/246700
PCT Pub. Date: Dec. 10, 2020

(65) Prior Publication Data
US 2021/0167460 A1    Jun. 3, 2021

(30) Foreign Application Priority Data

Jun. 4, 2019 (KR) .................. 10-2019-0066143

(51) Int. Cl.
*H01M 50/30* (2021.01)
*H01M 50/317* (2021.01)
(Continued)

(52) U.S. Cl.
CPC ............................ *H01M 50/394* (2021.01)

(58) Field of Classification Search
CPC ............ H01M 50/317; H01M 50/325; H01M 50/333; H01M 50/105
See application file for complete search history.

(56) References Cited

U.S. PATENT DOCUMENTS

| 6,040,081 A * | 3/2000 | Van Lerberghe ... H01M 50/553 429/162 |
| 9,735,408 B2 * | 8/2017 | Kim ..................... H01M 50/383 |

(Continued)

FOREIGN PATENT DOCUMENTS

| CN | 101512821 A | 8/2009 |
| CN | 104969377 A | 10/2015 |

(Continued)

OTHER PUBLICATIONS

Extended European Search Report for Application No. EP 20818869, dated Jul. 7, 2021, 8 pages.

(Continued)

*Primary Examiner* — Amanda J Barrow
(74) *Attorney, Agent, or Firm* — Lerner David LLP

(57) ABSTRACT

A secondary battery and a battery pack including the secondary battery are disclosed.

According to one aspect of the present invention, the secondary battery includes: a waterproof part configured to surround at least a portion of a circumference of the electrode assembly so that a gas within the exterior passes through the waterproof part, but a liquid within the exterior does not pass through the waterproof part; and a vent part provided in an inner surface of the exterior to provide a path through which the gas within the exterior is discharged to the outside when an internal pressure of the exterior exceeds a certain value.

9 Claims, 6 Drawing Sheets

(51) Int. Cl.
*H01M 50/325* (2021.01)
*H01M 50/333* (2021.01)

(56) References Cited

U.S. PATENT DOCUMENTS

| | | |
|---|---|---|
| 2007/0077470 A1 | 4/2007 | Adams et al. |
| 2009/0017365 A1* | 1/2009 | Miyahisa ............. H01M 50/211 |
| | | 429/54 |
| 2010/0239895 A1* | 9/2010 | Yang .................... H01M 50/119 |
| | | 429/53 |
| 2012/0196161 A1* | 8/2012 | Yang .................... H01M 50/55 |
| | | 429/53 |
| 2013/0004822 A1 | 1/2013 | Hashimoto et al. |
| 2013/0208405 A1 | 8/2013 | Okada et al. |
| 2016/0028051 A1 | 1/2016 | Yoon |
| 2016/0036024 A1 | 2/2016 | Choi et al. |
| 2016/0344004 A1 | 11/2016 | Kepler et al. |
| 2017/0012252 A1 | 1/2017 | Yoo et al. |
| 2017/0092901 A1 | 3/2017 | Yamafuku et al. |
| 2018/0114964 A1 | 4/2018 | Kim et al. |
| 2020/0287186 A1 | 9/2020 | Kim et al. |

FOREIGN PATENT DOCUMENTS

| | | | | |
|---|---|---|---|---|
| CN | 106169551 A | 11/2016 | | |
| JP | 2000260411 A | 9/2000 | | |
| JP | 2007-150055 A | 6/2007 | | |
| JP | 4130686 B2 | 8/2008 | | |
| JP | 2010503150 A | 1/2010 | | |
| JP | 2010-061972 | * 3/2010 | ............. Y02E 60/10 | |
| JP | 5362126 B2 | 12/2013 | | |
| JP | 2017062916 A | 3/2017 | | |
| JP | 2017506802 A | 3/2017 | | |
| JP | 2018-525804 A | 9/2018 | | |
| JP | 2018-195745 | * 12/2018 | ............. H01G 11/00 | |
| JP | 2018195745 A | † 12/2018 | | |
| KR | 20080019551 A | 3/2008 | | |
| KR | 100949175 B1 | 3/2010 | | |
| KR | 20120048407 A | 5/2012 | | |
| KR | 20130004141 A | 1/2013 | | |
| KR | 20150061996 A | 6/2015 | | |
| KR | 20150101551 A | 9/2015 | | |
| KR | 101653305 B1 | 9/2016 | | |
| KR | 20160111614 A | 9/2016 | | |
| KR | 20160129440 A | 11/2016 | | |
| KR | 101753213 B1 | 7/2017 | | |
| WO | 2007044425 A2 | 4/2007 | | |
| WO | 2008026854 A1 | † 3/2008 | | |
| WO | 2011070816 A1 | 6/2011 | | |

OTHER PUBLICATIONS

Search Report dated Jun. 28, 2022 from the Office Action for Chinese Application No. 202080003329.7 issued Jul. 5, 2022, pp. 1-4.
International Search Report for Application No. PCT/KR2020/004752 mailed Jul. 21, 2020, 2 pages.
Chen, Hanchao, "Pneumatic Motion Control", Beijing University of Technology Press, Jun. 30, 1987. 9 pgs.
Third Party Observation for Application No. 20818869.8, dated Apr. 17, 2023, pp. 1-28.

\* cited by examiner
† cited by third party

SECONDARY BATTERY AND BATTERY PACK INCLUDING THE SAME

CROSS-REFERENCE TO RELATED APPLICATION

The present application is a national phase entry under 35 U.S.C. § 371 of International Application No. PCT/KR2020/004752, filed on Apr. 8, 2020, published in Korean, which claims priority from the benefit of the priority of Korean Patent Application No. 10-2019-0066143, filed on Jun. 4, 2019, all of which is hereby incorporated herein by reference in its entirety.

TECHNICAL FIELD

The present invention relates to a secondary battery and a battery pack including the secondary battery, and more particularly, to a secondary battery having a structure in which, when an internal pressure of the secondary battery increases, a gas within the secondary battery is discharged in a desired direction, and a battery pack including the secondary battery.

BACKGROUND ART

Secondary batteries that are repetitively chargeable and dischargeable may be classified into cylindrical type secondary batteries, prismatic type secondary batteries, and pouch type secondary batteries according to their structures or manufacturing methods. Among them, the pouch type secondary battery has a structure in which an electrode assembly having a structure in which electrodes and separators are alternately disposed in a sheet-shaped pouch exterior is accommodated. In particular, the pouch type secondary battery has been widely used due to its relatively simple process and low manufacturing cost.

A pressure within the secondary battery may increase due to an abnormal operation of the secondary battery. Particularly, when the pressure within the secondary battery abnormally increases, there is a possibility of explosion of the secondary battery. In order to prevent the secondary battery from being exploded, when the pressure within the secondary battery exceeds a certain value, it is necessary to discharge a gas within the secondary battery to the outside.

However, since the gas within the secondary battery is in a high-temperature and high-pressure state, if the gas within the secondary battery is discharged to a wrong direction, structures around the secondary battery may be damaged. In order to prevent such a problem, it is necessary to design the secondary battery so that the gas within the secondary battery is discharged through a certain path.

Disclosure of the Invention Technical Problem

Therefore, an object to be achieved by the present invention is to prevent structures around a secondary battery from being damaged by discharging a gas within the secondary battery through a certain path when a pressure within the secondary battery abnormally increases.

Technical Solution

According to one aspect of the prevent invention for achieving the above object, a secondary battery includes: an electrode assembly having a structure in which electrodes and separators are alternately disposed; an exterior having an inner space in which the electrode assembly is accommodated; a waterproof part provided in the exterior to surround at least a portion of a circumference of the electrode assembly so that a gas within the exterior passes through the waterproof part, but a liquid within the exterior does not pass through the waterproof part; and a vent part provided in an inner surface of the exterior to provide a path through which the gas within the exterior is discharged to the outside when an internal pressure of the exterior exceeds a certain value, wherein the waterproof part is provided to face an inner surface, in which the vent part is provided, among inner surfaces of the exterior.

The exterior may have a structure in which two sheets of exterior sheets face each other, a circumferential part on which ends of the two sheets of exterior sheets face each other may be disposed on at least one surface of outer surfaces of the exterior, and the vent part may be provided in the inner surface corresponding to the outer surface, on which the circumferential part is disposed, among the inner surfaces of the exterior.

The secondary battery may further include an electrode lead protruding outward from one surface of the inner surfaces of the exterior, wherein the vent part may be provided in an inner surface except for the inner surface, from which the electrode lead protrudes, among the inner surfaces of the exterior.

The waterproof part may surround an entire circumference of the electrode assembly.

The vent part may include a first vent member and a second vent member, which face each other, and a distance between the first vent member and the second vent member may decrease as closer to the outside of the exterior from the inside of the exterior.

One end of the first vent member and one end of the second vent member, which extend outward from the exterior, may contact each other to block the path through which the gas within the exterior is discharged to the outside, and when the internal pressure of the exterior exceeds the certain value, the one end of the first vent member and the one end of the second vent member may be spaced apart from each other to provide the path through which the gas within the exterior is discharged to the outside.

The secondary battery may further include an elastic part provided between an inner surface of the circumferential part and the vent part to press the vent part by elastic force.

The elastic part may include: a first elastic member provided between the inner surface of the circumferential part and the first vent member to press the first vent member by the elastic force; and a second elastic member provided between the inner surface of the circumferential part and the second vent member to press the second vent member by the elastic force.

When the internal pressure of the exterior decreases again below the certain value, the one end of the first vent member and the one end of the second vent member may contact again each other to block again the path through which the gas within the exterior is discharged to the outside.

The two sheets of exterior sheets may be bonded to each other to provide a sealing part on a circumferential part except for the circumferential part disposed on the outer surface corresponding to the inner surface, in which the vent part is provided, on the circumferential part, and the two sheets of exterior sheets may not be bonded to each other or be bonded to each other with a bonding force that is less than that of the sealing part on the circumferential part disposed on the outer surface corresponding to the inner surface, in which the vent part is provided, on the circumferential part.

According to another aspect of the prevent invention for achieving the above object, a battery pack including the secondary battery is provided.

The exterior may have a structure in which two sheets of exterior face each other, each of the two sheets having a circumferential part on which the two sheets of exterior sheets face each other may be disposed on an upper outer surface, which faces an upper side, among of outer surfaces of the exterior, and the vent part may be provided in an inner surface corresponding to the upper outer surface, on which the circumferential part is disposed, among the inner surfaces of the exterior.

Advantageous Effects

According to the present invention, when the pressure within the secondary battery abnormally increases, the gas within the secondary battery may be discharged through the certain path to prevent the structure around the secondary battery from being damaged.

MODE FOR CARRYING OUT THE INVENTION

Figure 1:
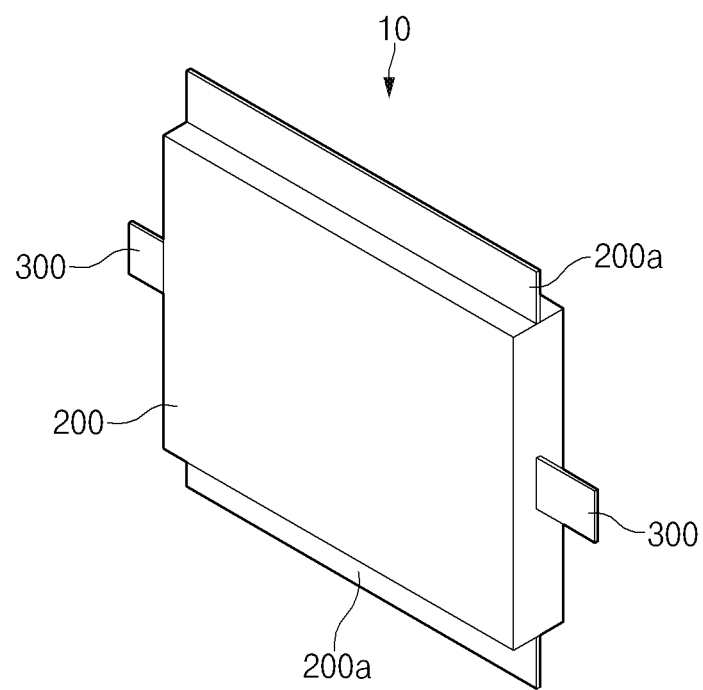
FIG. 1 is a perspective view illustrating a structure of a secondary battery according to an embodiment of the present invention.
Figure 2:
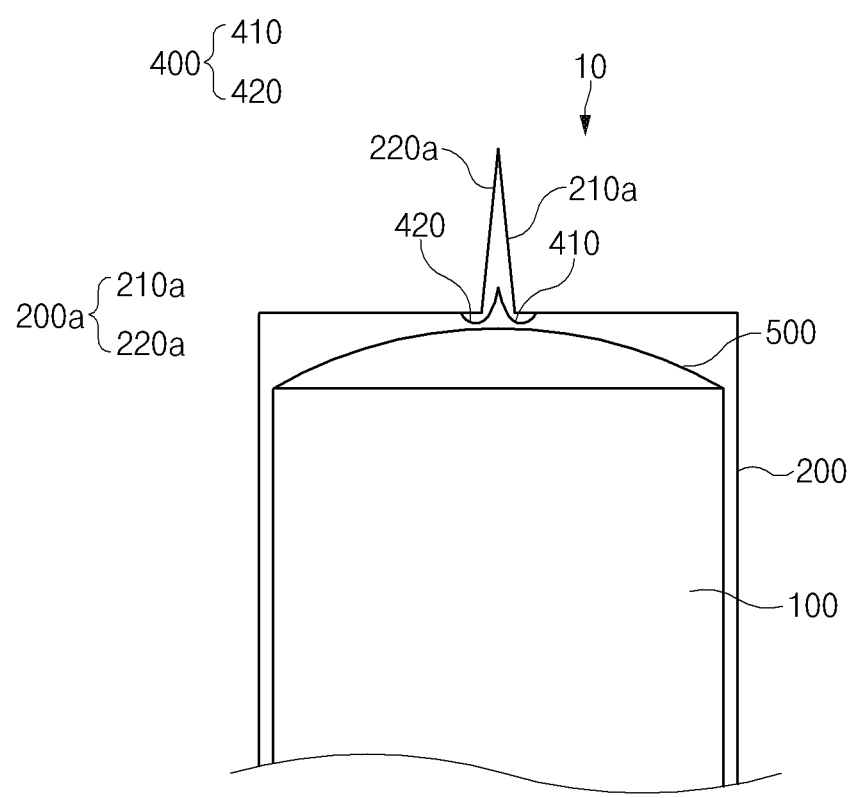
FIG. 2 is a side cross-sectional view illustrating a normal state of an upper structure of a secondary battery according to a first embodiment of the present invention.
Figure 3:
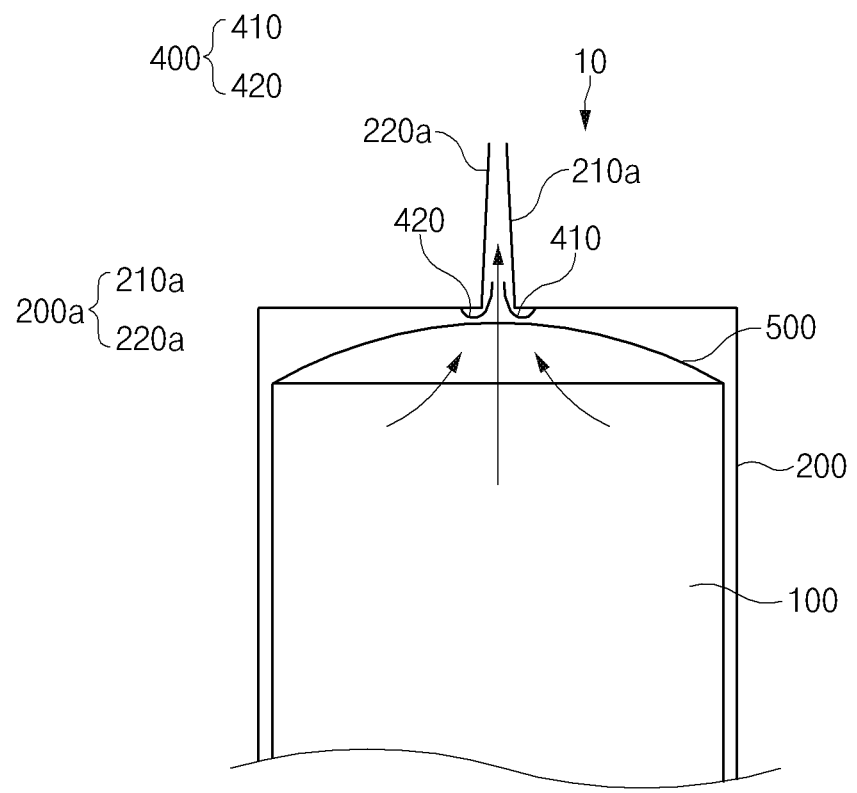
FIG. 3 is a side cross-sectional view illustrating a state of the upper structure of the secondary battery when an internal pressure of the secondary battery exceeds a certain value according to a first embodiment of the present invention.
Figure 4:
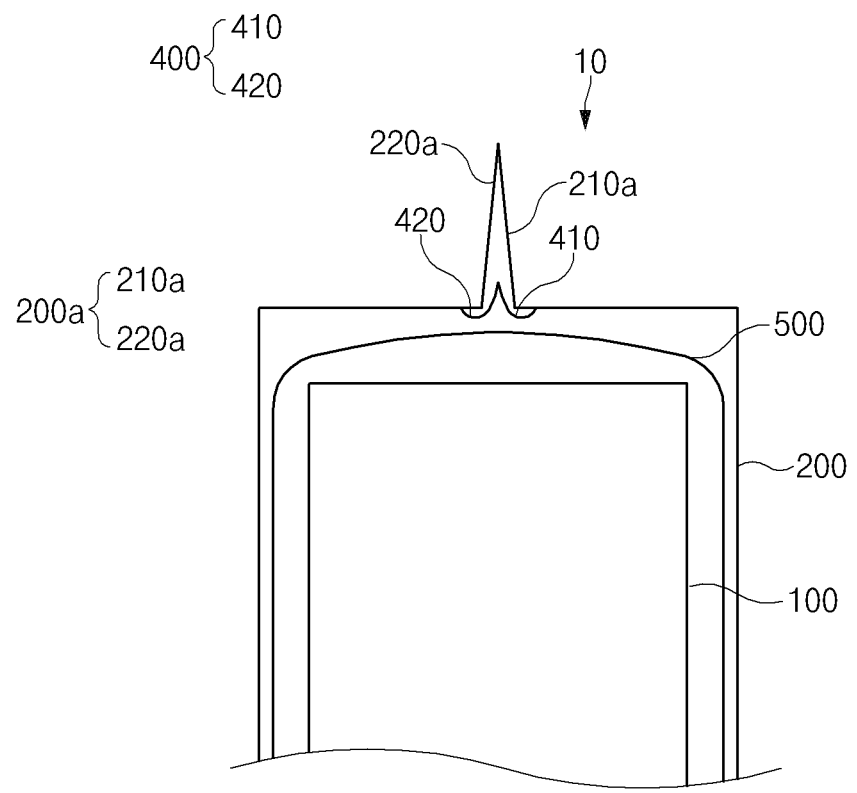
FIG. 4 is a side cross-sectional view illustrating a state of an upper structure of a secondary battery according to a second embodiment of the present invention.

Hereinafter, a secondary battery and a structure of a battery pack according to the present invention will be described with reference to the drawings.
Secondary Battery FIG. 1 is a perspective view illustrating a structure of a secondary battery according to an embodiment of the present invention, and FIG. 2 is a side cross-sectional view illustrating a normal state of an upper structure of a secondary battery according to a first embodiment of the present invention. FIG. 3 is a side cross-sectional view illustrating a state of the upper structure of the secondary battery when an internal pressure of the secondary battery exceeds a certain value according to a first embodiment of the present invention, and FIG. 4 is a side cross-sectional view illustrating a state of an upper structure of a secondary battery according to a second embodiment of the present invention.

As illustrated in FIGS. 1 and 3, a secondary battery 10 according to the present invention may include an electrode assembly 100. The electrode assembly 100 may have a structure in which electrodes and separators are alternately disposed.

Also, the secondary battery 10 may include an exterior 200 having an inner space in which the electrode assembly 100 is accommodated. The exterior 200 may have a pouch type exterior. That is, the secondary battery according to the present invention may be a pouch type secondary battery.

Continuously, referring to FIGS. 1 to 3, the exterior 200 of the secondary battery 10 according to the present invention may include a first exterior sheet 210a and a second exterior sheet 220a. Also, the secondary battery 10 according to the present invention may include a circumferential part 200a at which the first exterior sheet 210a and the second exterior sheet 220a of the exterior 200 face each other. The circumferential part 200a may have a structure in which ends of the first exterior sheet 210a and the second exterior sheet 220a face each other. The circumference 200a may be disposed on at least one surface of outer surfaces of the exterior 200. FIG. 1 illustrates a state in which the circumferential part 200a is disposed on each of a top surface and a bottom surface of the exterior 200.

In addition, the secondary battery 10 according to the present invention may further include an electrode lead 300 protruding from one surface of the exterior 200. The electrode lead 300 is configured to be electrically connected to an electrode tab (not shown) of the electrode assembly 100 and may have a structure that protrudes outward from one surface of inner surfaces of the exterior 200. FIG. 1 illustrates a state in which two electrode leads 300 protrude in opposite directions.

As illustrated in FIGS. 2 and 3, the secondary battery 10 according to the present invention may include a vent part 400 that provides a path through which a gas within the exterior 200 is discharged to the outside when an internal pressure of the exterior 200 exceeds a certain value.

The vent part 400 may include a first vent member 410 and a second vent member 420. Here, the first vent member 410 and the second vent member 420 may be disposed to symmetrically face each other.

The vent part 400 may be provided in an inner surface corresponding to an outer surface on which the circumferential part 200a is disposed, among the inner surfaces of the exterior 200. FIGS. 2 and 3 illustrate a state in which the vent part 400 is provided in the inner surface corresponding to the upper outer surface on which the circumferential part 200a is disposed among the inner surfaces of the exterior 200.

Also, the first vent member 410 and the second vent member 420 may extend outward from the exterior 200. Here, a distance between the first vent member 410 and the second vent member 420 may gradually decrease towards the outside of the exterior 200. Also, as illustrated in FIG. 2, since one end of the first vent member 410 and one end of the second vent member 420, which extend outward from the exterior 200, contact each other, the path through which the gas within the exterior 200 passes through the vent part 400 and is discharged to the outside may be blocked in ordinary time.

Continuously, referring to FIGS. 2 and 3, the vent part 400 may be provided in the inner surface except for the inner surface, from which the electrode lead 300 protrudes, among the inner surfaces of the exterior 200.

When the vent part is provided in the inner surface from which the electrode lead protrudes, the gas may contact the electrode lead while the gas within the secondary battery is discharged to the outside through the vent part. In this case, the electrode lead may be deformed or damaged by a temperature and pressure of the gas that is discharged to the outside through the vent part. Thus, according to the present invention, the vent part 400 may be provided in the inner surface except for the inner surface, through which the electrode lead 300 protrudes, among the inner surfaces of the exterior 200.

The principle in which the gas within the secondary battery 10 is discharged to the outside through the vent part 400 according to the present invention is as follows.

When the internal pressure of the exterior 200 exceeds a certain value due to an abnormal operation of the secondary battery 10, as illustrated in FIG. 3, the one end of the first vent member 410 and the one end of the second vent member 420, which are in a state of contacting each other in the ordinary time, are spaced apart from each other by the internal pressure of the exterior 200, and thus, the gas within the secondary battery 10 is discharged to the outside.

That is, when the internal pressure of the exterior 200 exceeds a fixed one value in a region adjacent to the vent part 400, the secondary battery 10 may be manufactured so that the first vent part 410 and the second vent part 420 of the vent part 400 are spaced apart from each other. For example, when the internal pressure of the exterior 200 exceeds a specific value A in the region adjacent to the vent part 400, the first vent member 410 and the second vent member 420 may be spaced apart from each other, and thus, the gas within the secondary battery 10 may be discharged to the outside.

When the gas within the exterior 200 is discharged, and thus, the internal pressure of the exterior 200 decreases again below the certain value, the one end of the first vent member 410 and the one end of the second vent member 420 may contact again each other to block again the path through which the gas within the exterior 200 is discharged to the outside. That is, the first vent member 410 and the second vent member 420 of the vent part 400 according to the present invention may be configured so that the contact and space therebetween is repeatedly performed according to the internal pressure of the exterior 200.

According to the present invention, since the vent part 400 is provided in the secondary battery 10, when the pressure inside the secondary battery increases abnormally, the gas within the secondary battery 10 may be discharged to the outside through the certain path provided by the opening vent part 400. Thus, according to the present invention, it is possible to prevent unexpected damage of structures around the secondary battery, which may occur when the path through which the gas within the secondary battery is discharged is not constant.

Referring to FIGS. 1 to 3, in the secondary battery 10 according to the present invention, two sheets of exterior sheets may be bonded to each other on at least a portion of the circumferential surface 200a. That is, according to the present invention, the first exterior sheet 210a and the second exterior sheet 220a may be bonded to each other to provide a sealing part on the circumferential part except for the circumferential part disposed on the outer surface corresponding to the inner surface, in which the vent part 400 is provided, on the circumferential part 200a. Referring to FIG. 1, the first exterior sheet 210a and the second exterior sheet 220a may be bonded to each other to provide the sealing part at the circumferential part 200a disposed on the bottom surface of the exterior 200.

On the other hand, in the secondary battery 10 according to the present invention, the two sheets of exterior sheets may not be bonded to each other or may be bonded to each other with bonding force less than that of the sealing part at the other portion of the circumferential part 200a. Referring to FIG. 1, the first exterior sheet 210a and the second exterior sheet 220a may not be bonded to each other or may be bonded to each other with bonding force less than that of the sealing part at the circumferential part 200a disposed on the top surface of the exterior 200. In this case, when the internal pressure of the exterior 200 exceeds the certain value, the gas within the exterior 200 may be quickly discharged to the outside through the vent part 400 before the other region of the exterior is broken.

The secondary battery 10 according to the present invention may further include a waterproof part 500 provided in the exterior 200 to surround at least a portion of a circumference of the electrode assembly 100. The waterproof part 500 may be configured to allow the gas within the exterior 200 to pass therethrough and allow a liquid within the exterior 200 so as not to pass therethrough. The waterproof part 500 may have a waterproof property and may be fabric having a mesh structure.

As illustrated in FIG. 2, the waterproof part 500 may be provided to face the inner surface, in which the vent part 400 is provided, among the inner surfaces of the exterior 200. FIG. 2 illustrates a state in which the waterproof part 500 is provided to face the upper inner surface of the exterior 200 in which the vent part 400 is provided.

According to the present invention, since the waterproof part 500 is provided to face the inner surface, in which the vent part 400 is provided, among the inner surfaces of the exterior 200, when the internal pressure of the exterior 200 exceeds a certain value, the gas within the secondary battery 10 may be discharged to the outside via the vent part 400 and the circumferential part 200a after passing through the waterproof part 500, but the liquid (for example, an electrolyte) within the secondary battery 10 may not be discharged to the outside, or discharge of the liquid to the outside may be minimized.

A main effect on the internal pressure of the exterior 200 of the secondary battery 10 may be affected to the gas, not the liquid, within the secondary battery 10. Particularly, when the electrolyte leaks to the outside, the secondary battery may not properly operate. Thus, according to the present invention, when the internal pressure of the exterior exceeds a certain value, only the gas affected by the main effect of the internal pressure of the exterior 200 may be discharged to the outside. As a result, even though the internal pressure of the exterior 200 increases abnormally, the operation of the secondary battery 10 may be stopped due to the discharge of the liquid within the secondary battery.

FIG. 4 is a side cross-sectional view illustrating a state of an upper structure of a secondary battery according to a second embodiment of the present invention.

As illustrated in FIG. 3, according to the first embodiment of the present invention, the waterproof part 500 may surround only a portion of the circumferential part of the electrode assembly 100 (particularly, a region facing the vent part in the electrode assembly). However, as illustrated in FIG. 4, according to the second embodiment of the present invention, a waterproof part 500 may surround an entire circumference of an electrode assembly 100. According to a second embodiment of the present invention, since the waterproof part 500 surrounds the entire region of the electrode assembly 100, it may be possible to fundamentally block discharge of a liquid within the waterproof part 500 to the outside.

Figure 5:
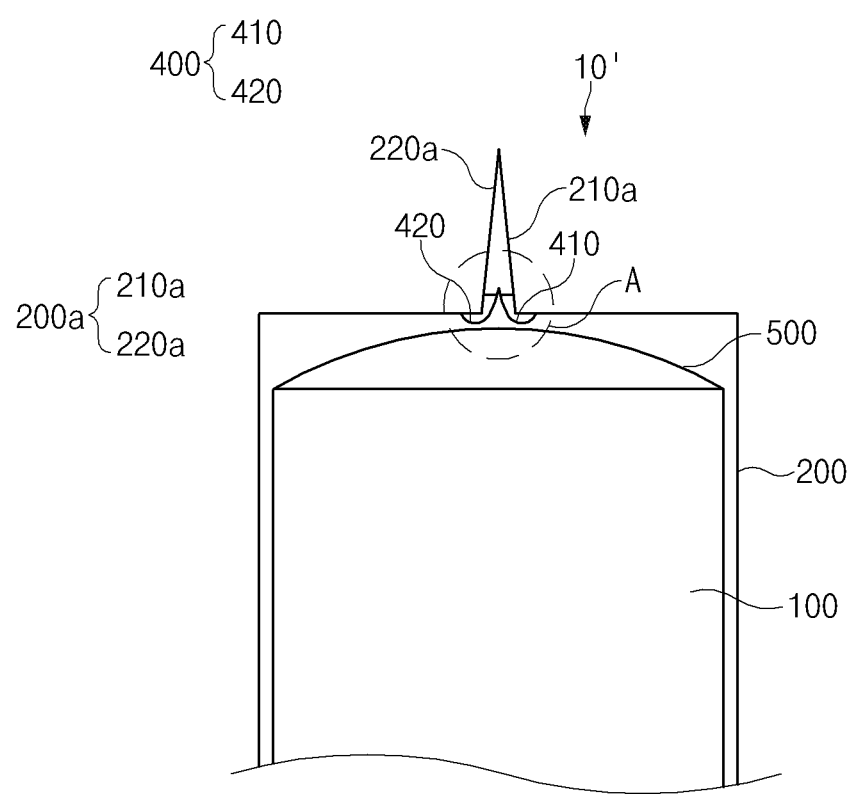
FIG. 5 is a side cross-sectional view illustrating a state of an upper structure of a secondary battery according to a third embodiment of the present invention.
Figure 6:
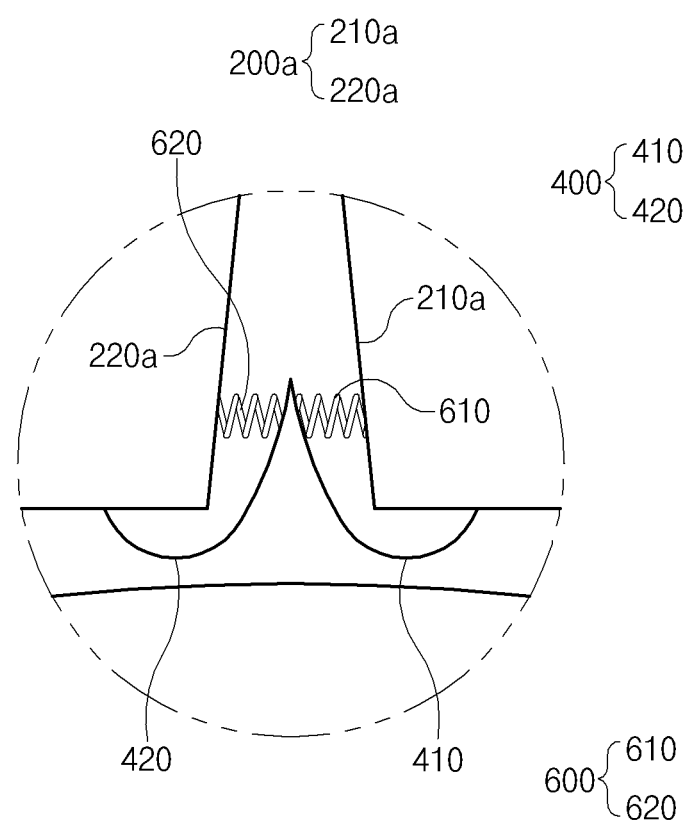
FIG. 6 is an enlarged side cross-sectional view of a region A of FIG. 5.

FIG. 5 is a side cross-sectional view illustrating a state of an upper structure of a secondary battery according to a third embodiment of the present invention, and FIG. 6 is an enlarged side cross-sectional view of a region A of FIG. 5.

A secondary battery 10 according to a third embodiment of the present invention may further include an elastic part 600 provided between an inner surface of a circumferential part 200a and a vent part 400. The elastic part 600 is configured to press the vent part 400 by elastic force and may be made of a material having elasticity.

As illustrated in FIGS. 5 and 6, the elastic part 600 may include a first elastic member 610 and a second elastic member 620. The first elastic member 610 may be provided between the inner surface of the circumferential part 200a and a first vent member 410, and the second elastic member 620 may be provided between the inner surface of the circumferential part 200a and a second vent member 420. The first elastic member 610 may press the first vent member 410 by the elastic force, and the second elastic member 620 may press the second vent member 420 by the elastic force. For example, each of the first elastic member 610 and the second elastic member 620 may be a spring. One end and the other end of the first elastic member 610 may be attached to an inner surface of a first exterior sheet 210a and the first vent member 410, respectively. In addition, one end and the other end of the second elastic member 620 may be attached to an inner surface of a second exterior sheet 220a and the second vent member 420.

According to the third embodiment of the present invention, when an internal pressure of the exterior 200 is less than a certain value, the first vent member 410 and the second vent member 420 may more stably contact each other by the elastic force of the elastic part 600. More preferably, the first elastic member 610 and the second elastic member 620 may press an area on which the first vent member 410 and the second vent member 420 contact with each other (that is, an area on which the one end of the first vent member and the one end of the second vent member, which extend outward from the exterior, contact each other).

Battery Pack

A battery pack according to the present invention may include a plurality of secondary batteries.

As described above, a circumferential part on which two sheets of exterior sheets face each other may be disposed on at least a portion of outer surfaces of an exterior of the secondary battery according to the present invention. Here, the circumferential part may be disposed on an upper outer surface, which facing an upper side, among the outer surfaces of the exterior.

Also, a vent part of the secondary battery may be provided in an inner surface corresponding to the upper outer surface, on which the circumferential part is disposed, among the inner surfaces of the exterior.

Other contents of the structure of the secondary battery 10 are replaced with the contents described above with reference to FIGS. 1 to 6 for the structure of the secondary battery.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

10: Secondary battery
100: Electrode assembly
200: Exterior
200a: Circumferential part
210a: First exterior sheet
220a: Second exterior sheet
300: Electrode lead
400: Vent part
410: First vent member
420: Second vent member
500: Waterproof part
600: Elastic part
610: First Elastic member
620: Second Elastic member

The invention claimed is:

1. A secondary battery comprising:
an electrode assembly having a structure in which electrodes and separators are alternately disposed;
an exterior having an inner space in which the electrode assembly is accommodated, the exterior including two exterior sheets that face each other to form a circumferential part;
a waterproof part provided within the exterior to surround at least a portion of a circumference of the electrode assembly and configured to allow a gas within the exterior to pass through the waterproof part, but prevent a liquid within the exterior from passing through the waterproof part;
a vent part including a first vent member and a second vent member, which face each other, the vent part provided on an inner surface of the exterior to provide a path through which gas within the exterior is discharged to an outside of the secondary battery when an internal pressure of the exterior exceeds a certain value; and
an elastic part provided within the circumferential part to press the vent part by elastic force, the elastic part including a first elastic member provided between one inner surface of the circumferential part and the first vent member to press the first vent member by the elastic force, and a second elastic member provided between another inner surface of the circumferential part and the second vent member to press the second vent member by the elastic force,
wherein the waterproof part is provided to face the inner surface of the exterior, in which the vent part is provided, and
wherein when the internal pressure of the exterior decreases below the certain value again, the first vent member and the second vent member more stably contact each other by the elastic force of the elastic part to block the path through which the gas within the exterior is discharged to the outside of the secondary battery.

2. The secondary battery of claim 1,
wherein a first portion of the circumferential part extends away from the inner surface of the exterior at which the vent part is provided.

3. The secondary battery of claim 1, further comprising an electrode lead protruding outward from a side of the exterior different than the inner surface of the exterior at which the vent part is provided.

4. The secondary battery of claim 1, wherein the waterproof part surrounds an entire circumference of the electrode assembly.

5. The secondary battery of claim 2, wherein
a distance between the first vent member and the second vent member decreases in a direction from the inner surface of the exterior toward the outside of the secondary battery.

6. The secondary battery of claim 5, wherein one end of the first vent member and one end of the second vent member, which extend toward the outside of the secondary battery, contact each other to block the path through which the gas within the exterior is discharged to the outside of the secondary battery, and when the internal pressure of the exterior exceeds the certain value, the one end of the first vent member and the one end of the second vent member are spaced apart from each other to provide the path through which the gas within the exterior is discharged to the outside of the secondary battery.

7. The secondary battery of claim 6, wherein, when the internal pressure of the exterior decreases below the certain value again, the one end of the first vent member and the one end of the second vent member contact each other to block the path through which the gas within the exterior is discharged to the outside.

8. The secondary battery of claim 2, wherein a second portion of the circumferential part of the two exterior sheets are bonded to each other to provide a sealing part, and the first portion of the two exterior sheets of the circumferential part are not bonded to each other or are bonded to each other with a bonding force that is less than that of the sealing part on the second portion of the circumferential part of the two exterior sheets.

9. A battery pack comprising the secondary battery of claim 1.

\* \* \* \* \*